United States Patent [19]

Vandegrift et al.

[11] 4,415,412

[45] Nov. 15, 1983

[54] PRODUCTION OF ANHYDROUS ALUMINUM CHLORIDE COMPOSITION AND PROCESS FOR ELECTROLYSIS THEREOF

[76] Inventors: George F. Vandegrift, Bolingbrook; Michael Krumpelt, Naperville; E. Philip Horwitz, Hinsdale, all of Ill.

[73] Assignee: The United States of America as represented by the U.S. Department of Energy, Washington, D.C.

[21] Appl. No.: 309,655

[22] Filed: Oct. 8, 1981

[51] Int. Cl.[3] .................. C25C 3/06; C01F 7/58; C01F 7/60
[52] U.S. Cl. .................. 204/67; 423/495
[58] Field of Search .................. 204/67; 423/495

[56] References Cited

U.S. PATENT DOCUMENTS

| | | | |
|---|---|---|---|
| 1,546,290 | 7/1925 | Humphrey | 423/495 |
| 1,818,839 | 8/1931 | Brindley | 423/495 |
| 4,108,968 | 8/1978 | Jacobs et al. | 204/67 |
| 4,252,774 | 2/1981 | Loutfy et al. | 423/76 |

OTHER PUBLICATIONS

Yamani et al., Extraction & Separation of Beryllium (II) & Aluminum (III) by Di-(2-Ethyl-Hexyl)-Phosphoric Acid from Sulphate Media.
Guen et al., The Chemistry of Fused Salts (ANL).
Marcus, "Solvent Extraction from Molten Salts", Solvent Extraction Chemistry, Amsterdam (1967) pp. 555-580.
Vandegrift et al., J. Inorg. Nucl. Chem. (1977) vol. 39, pp. 1425-1432.
Blake et al., Solvent Extraction of U & Other Metals by Acidic & Neutral Organophosphorus Compounds (ORNL).
Sato et al., Analytica Chimica Acta (1975) vol. 76, pp. 401-408.
Ashbrook, Coordination Chemistry Reviews (1975), vol. 16, pp. 286-307.
Sato et al., The Kinetics of Aluminum (III) Extraction from Sulfuric Acid Solutions by Di-(2-Ethylhexyl)--Phosphoric Acid.
George et al., Journal of Metals, Sep., 1968, p. 68.
Flett et al., Extraction of Metals by Carboxylic Acids, pp. 1-50.

Primary Examiner—Howard S. Williams
Attorney, Agent, or Firm—William Lohff; Hugh W. Glenn; Richard G. Besha

[57] ABSTRACT

A process for producing an anhydrous aluminum chloride composition from a water-based aluminous material such as a slurry of aluminum hydroxide in a multistage extraction process in which the aluminum ion is first extracted into an organic liquid containing an acidic extractant and then extracted from the organic phase into an alkali metal chloride or chlorides to form a melt containing a mixture of chlorides of alkali metal and aluminum. In the process, the organic liquid may be recycled. In addition, the process advantageously includes an electrolysis cell for producing metallic aluminum and the alkali metal chloride or chlorides may be recycled for extraction of the aluminum from the organic phase.

14 Claims, 2 Drawing Figures

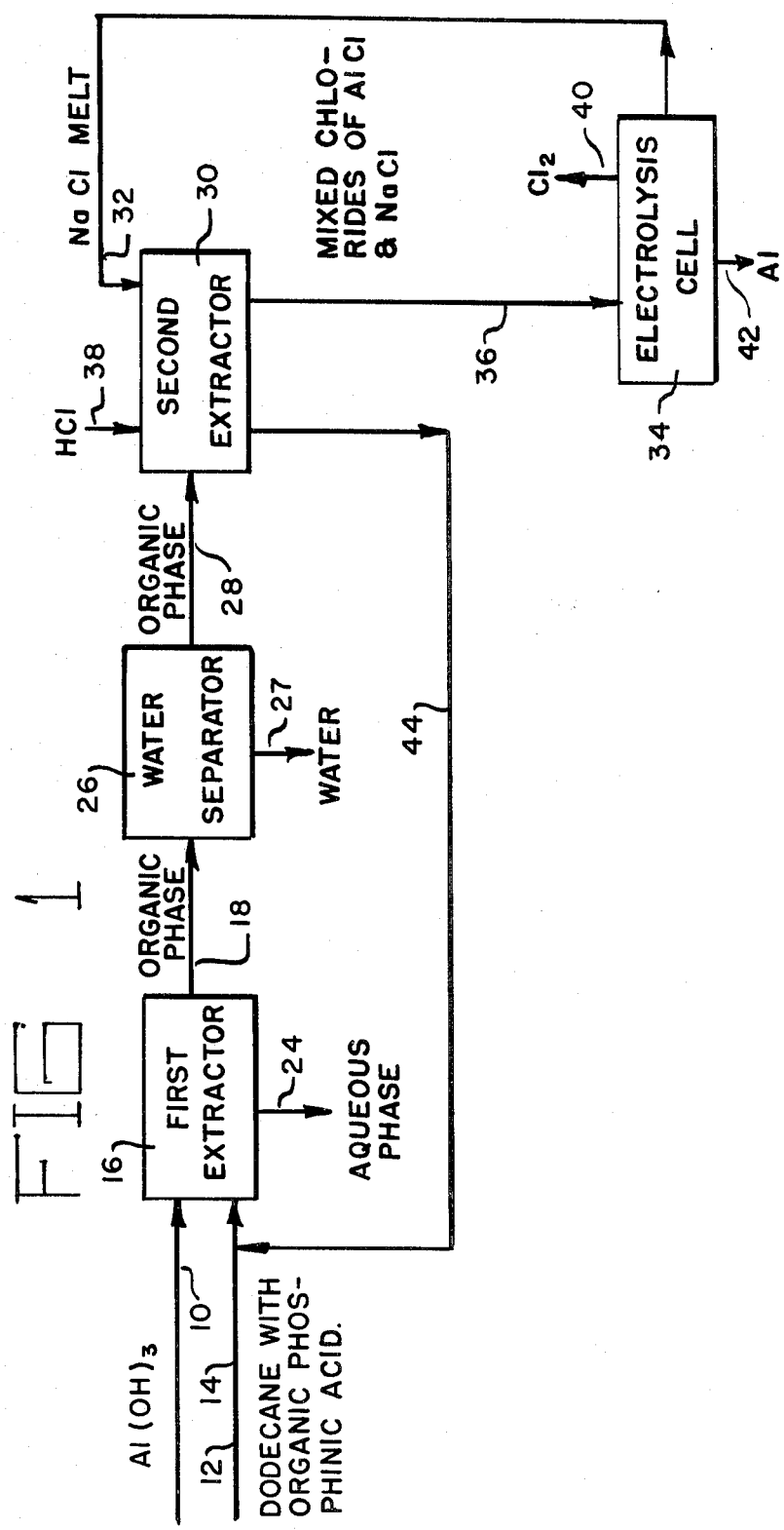

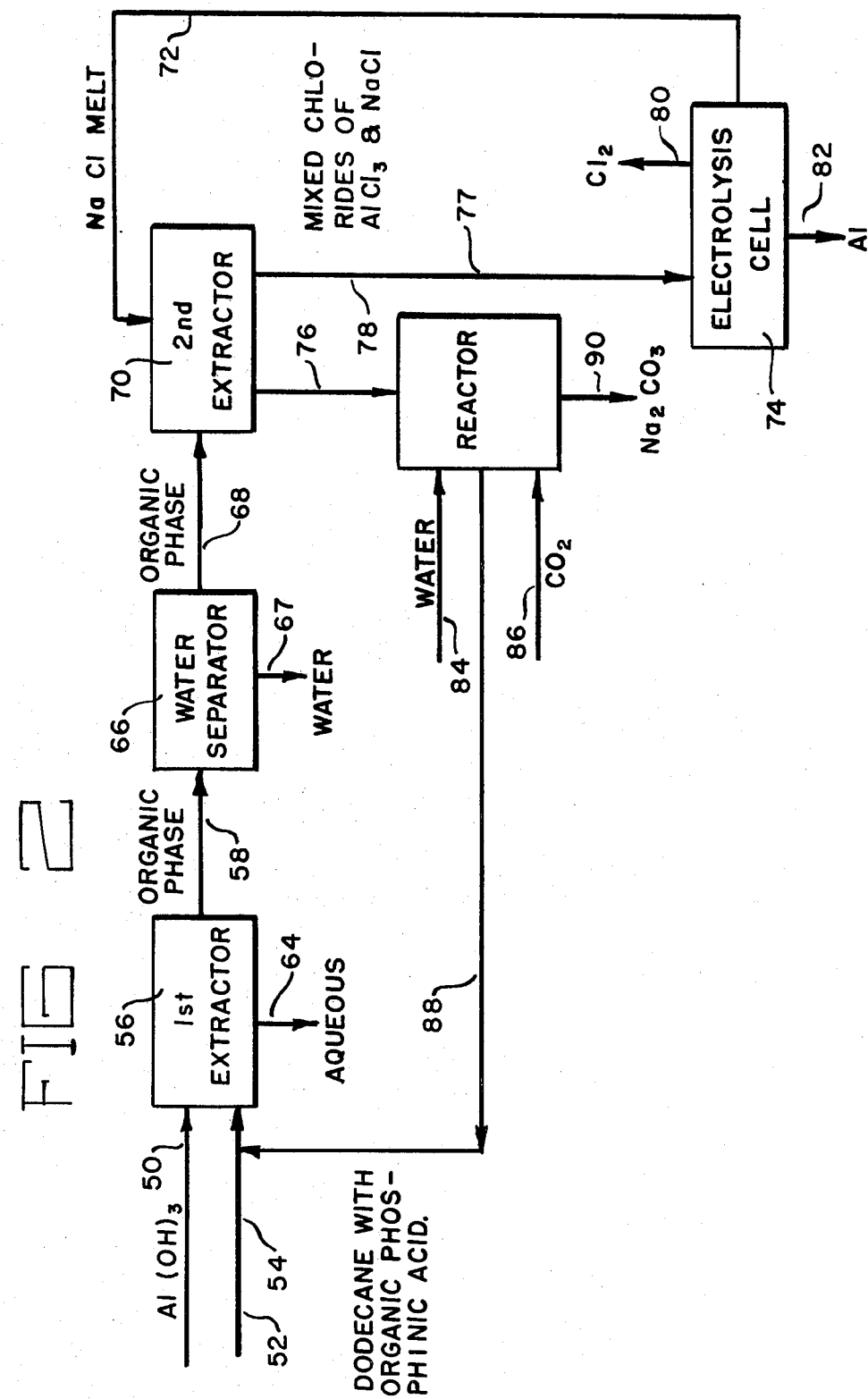

PRODUCTION OF ANHYDROUS ALUMINUM CHLORIDE COMPOSITION AND PROCESS FOR ELECTROLYSIS THEREOF

CONTRACTUAL ORIGIN OF THE INVENTION

The United States Government has rights in this invention pursuant to Contract No. W-31-109-ENG-38 between the U.S. Department of Energy and the University of Chicago representing Argonne National Laboratory.

BACKGROUND OF THE INVENTION

This invention relates to the production of an anhydrous aluminum chloride composition and more particularly to the production of the anhydrous aluminum chloride composition from a water-based aluminous material such as an aqueous slurry of aluminum hydroxide by a multistage extraction process in which aluminum in dehydrated form is extracted into an organic liquid phase and subsequently extracted from the organic phase into a metal chloride melt. One important use of the anhydrous aluminum chloride composition is as a feedstock for an electrolysis cell in which metallic aluminum is produced from anhydrous aluminum chloride.

Traditionally, metallic aluminum has been produced by the established Bayer-Hall-Heroult process in which aluminum oxide is electrolyzed in cryolite to the metallic form. Large amounts of energy are consumed in the process. More recently a process has been developed which utilizes anhydrous aluminum choride in place of aluminum oxide and operates at a lower working temperature and a higher current density. thereby substantially reducing energy consumption.

In the electrolysis process, the bath includes a melt of mixed chlorides composed of one or more alkali metal chlorides in addition to anhydrous aluminum chloride. Typically, the aluminum chloride is present in an amount of about 5 mole %.

Anhydrous aluminum chloride for the electrolysis process is prepared by reacting aluminum oxide, carbon (from fuel oil) and chlorine gas. In addition to aluminum chloride, carbon tetrachloride and other chlorinated organics are produced which have objectionable environmental properties. Also, the process requires the use of equipment fabricated from materials resistant to the chlorine gas and these materials are often expensive. Further details related to the use of aluminum chloride and its preparation may be found in the disclosure in U.S. Pat. No. 4,252,774.

It is important that the aluminum chloride used in the electrolysis process be anhydrous and not be contaminated with water, including water of hydration. With water present, as in hydrated aluminum chloride, the chloride will be at least partially converted to the oxide thereby depleting the aluminum chloride available for producing the metallic aluminum.

One object of this invention is a process for preparing an anhydrous aluminum chloride composition at a relatively low temperature. Another object of the invention is a process of preparing an anhydrous aluminum chloride composition without a reaction involving the production of carbon tetrachlorde or other organic chlorides. A further object of this invention is a process for preparing an anhydrous aluminum chloride composition which does not involve a chlorination reaction with carbon or organic materials. Still another object of this invention is a process of preparing an aluminum chloride composition which is anhydrous and may be utilized as a feedback for an electrolysis cell for producing metallic aluminum. Yet another object of this invention is a process for preparing an anhydrous aluminum chloride composition which may be coupled to an electrolysis cell to provide a continuous source of feedstock for the cell. It is also an object to provide a process in which one or more components may be recycled. Additional objects, advantages, and novel features of the invention will be set forth in part in the description which follows, and in part will become apparent to those skilled in the art upon examination of the following or may be learned by practice of the invention.

SUMMARY

Briefly, the invention relates to a process for preparing an anhydrous aluminum chloride composition from a water-based aluminous material in a multistage extraction operation. In a first extraction stage, an organic liquid containing an acidic organic extractant is mixed with the aluminous material preferably in an aqueous solution or slurry to extract dehydrated aluminum into the organic liquid forming an organic phase. After separation from the aqueous phase, the organic phase containing a dehydrated aluminum composition is mixed in a subsequent stage with a salt of an alkali metal and preferably a chloride salt of one or more alkali metals to extract aluminum from the organic phase and form a mixed salt of the chlorides of the alkali metal or alkali metals and aluminum as an aluminum chloride composition. The organic phase is separated from the chloride melt and may be recycled to the first mixing stage.

Advantageously, the process includes a step of providing a source of hydrogen ion at the mixing stage with the chloride salt or at a later stage to regenerate the acidic extractant. The process also may operate in combination with an electrolysis cell for producing metallic aluminum from anhydrous aluminum chloride in a bath containing one or more alkali metal chlorides. When the process includes an electrolysis cell, the salt of the alkali metal chloride or chlorides is advantageously recycled and provides a feedstock of aluminum chloride for the cell.

A BRIEF DESCRIPTION OF THE DRAWINGS

FIG. 1 is a block diagram in simplified form showing one process of the invention for preparing anhydrous aluminum chloride and for providing aluminum feedstock for an electrolysis cell for producing metallic aluminum.

FIG. 2 is a second block diagram in simplified form showing a second process of the invention for preparing anhydrous aluminum chloride and for providing a feedstock for an electrolysis cell for producing metallic aluminum.

A DETAILED DESCRIPTION OF THE INVENTION

In the inventive process for preparing an anhydrous aluminum chloride composition, a water-based aluminous material is mixed with an organic liquid containing an acidic extractant under aluminum ion-extracting conditions. Suitable aluminous materials include aluminum hydroxide, aluminum oxide and other aluminum compounds such as hydrated aluminum chloride in a slurry or solution to form an aqueous phase. Aluminum hydroxide is preferred.

The organic liquid or diluent is substantially immiscible in water and provides a solvent for the dehydrated aluminum extracted by the acidic extractant. Since aluminum chloride is produced in the later extraction step, the organic liquid should be resistant to polymerization or reaction by contact with the chloride. Suitable liquids include saturated hydrocarbons and trialkyl phosphine oxides (including mixtures) which are stable under the particular temperature and other conditions of the process. With a process operating at maximum temperatures in the order of about 200° C. for the subsequent extraction step and with alkali metal chloride melts, organic liquids suitably are the saturated aliphatics containing about 10-20 carbon atoms (branched and normal including mixtures), advantageously 12-20 carbon atoms, and particularly the straight chain hydrocarbons with 12-18 carbon atoms; and trialkyl phosphine oxides with a total of about 12-36 carbon atoms (branched and normal including mixtures) and preferably about 15-36 carbon atoms. Illustrative of the saturated aliphatics are decane, dodecane, tetradecane, hexadecane, octadecane, and eicosane. A mixture of $C_{12}$-$C_{20}$ carbon atom alkanes is preferred. Illustrative of the trialkyl phosphine oxides are tributyl phosphine oxide, trioctyl phosphine oxide, tridecyl phosphine oxide, tridodecyl phosphine oxide, and phospine oxides of different alkyl groups where the alkyl groups may be normal or branched.

The acidic extractant is selected on the basis of being capable of extracting the dehydrated aluminum ion from the aluminous material as by complexing the aluminum ion so as to dehydrate it when it enters the organic liquid while being a weak enough acid so that in the subsequent extraction step, the aluminum ion may be extracted into or transferred to the chloride salt.

Advantageously, the acid extract includes phosphorous based acids such as organic phosphoric, phosphonic and phosphinic acids and carboxylic acids with saturated hydrocarbon portions containing about 8-18 carbon atoms. Illustrative of the phosphorous based acids are those with saturated hydrocarbon portions having a total of 12-36 carbon atoms including phosphoric, phosphonic and phosphinic acids with alkyl groups (branched and normal) being hexyl, octyl, dodecyl, octadecyl, and combinations of alkyl groups. Acids with a total of 12-24 carbon atoms are preferred. Dialkyl phosphinic acids are preferred at elevated temperatures in the order of 200° C. since dialkyl phosphoric acids at those temperatures in some instances are unstable. Illustrative of the carboxylic acids are normal or branched octanoic acid, decanoic acid, dodecanoic acid, tetradecanoic acid, octadecanoic acid and the like. Mixtures of the acids may be utilized. The versatic acids (2,2,2 trialkyl acetic acid) where the alkyl groups total about 7 carbon atoms are preferred as the carboxylic acid.

In a test directed to determining the dehydration of aluminum, a solution of bis (2-ethylhexyl) phosphoric acid (HX) in dodecane was mixed with aqueous aluminum chloride necessary to produce a 0.167 M $AL(X)_3(HX)_3$ where X is the anion of the phosphoric acid. During extraction, the aqueous pH was adjusted by aqueous ammonium hydroxide since the pH dropped as aluminum extraction occurred. Completion of the extraction was noted by the pH remaining high with the addition of aqueous ammonium hydroxide. The water content of the organic solution was measured by conventional Karl Fischer titration and by nuclear magnetic resonance (NMR). The results of both were in agreement indicating that the only water present was unbound water. The solution was also contacted with a 4 A molecular sieve and its water content decreased to essentially zero indicating that essentially no (less than 0.1 M $H_2O$) water of hydration was present.

Following the initial mixing stage, the organic phase is mixed with a salt of one or more alkali metal chlorides to extract the aluminum from the organic phase. Suitably, the alkali metal chlorides include sodium, potassium and lithium chlorides and mixtures. The mixing may be carried out in the presence of hydrogen chloride gas to regenerate the acidic extractant, or the organic phase after separation from the resulting mixed chloride melt containing aluminum chloride may be treated with a mineral acid to regenerate the extractant. Suitable acids include carbonic acid, hydrochloric acid, sulfuric acid, and nitric acid with carbonic acid and sulfuric acid being preferred.

The process may be further illustrated by the following reactions:

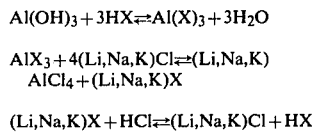

where X is the anion of the acidic extractant. In the first mixing stage represented by the first reaction, the mixing of the aqueous phase and the organic liquid is carried out under extracting conditions to transfer dehydrated aluminum into the orgranic liquid to form an organic phase containing $Al(X)_3$ as an aluminum composition. Suitably, the reaction is carried out with a pH in the acid range of about 2.5-5.5 and preferably about 3.5-4.5. The temperature is in the order of about 25°-95° C., advantageously about 60°-95° C. and preferably about 80° C. The acidic extractant is present in a concentration of about 1-2 moles per liter of organic liquid. A ratio by volume of aqueous phase to organic liquid is in the order of about 1:10-10:1 with a mixing time ranging from a few seconds to about one hour. The mixing may be carried out in a conventional vessel for mixing or mixing-separating.

After separation from the aqueous phase, the organic phase is dried to remove any entrained and/or solubilized water. Typically, the drying may be carried out by azeotropic distillation with tolune or other suitable material.

Subsequently, the organic phase is mixed with a chloride salt composed of one or more alkali metal chlorides at an elevated temperature and under conditions for the extraction of aluminum as aluminum chloride into the salt composition. This mixing stage is illustrated by the second reaction shown above. When a hydrogen chloride is present, the second and third reactions represent the conditions. As the aluminum is extracted during the mixing, the salt composition is altered to include aluminum chloride and its melting point is lowered. In some instances, a low melting eutectic is formed. When sodium chloride is used alone, the eutectic is estimated to contain about 60 mole % of aluminum chloride and to melt at about 150° C. For mixed chlorides, an illustrative eutectic composed of about 20 mole % sodium chloride and 14 mole % potassium chloride is estimated to contain about 66 mole % aluminum chloride and to melt at about 70° C.

While the initial salt composition and resulting mixed chlorides of the alkali metal and aluminum are melts at the operating temperatures of about 125°–200° C., the salt may be initially added as a solid with the melt being formed as the aluminum is extracted.

Suitably, the salt and organic phase are present in a ratio by volume of about 1:10–10:1 with mixing being carried out for a time ranging from about a few seconds to one hours. The temperature is sufficient to form the mixed chlorides of a alkali metal and aluminum as a melt. Advantageously, the source of the salt is an electrolysis cell and the initial salt composition may contain some anhydrous aluminum chloride and be at a temperature sufficient to form a melt. Under these conditions, the alkali metal chloride or chlorides are transferred from the electrolysis cell to the mixing stage with the organic phase and returned to the electrolysis cell. In the melt formed in the mixing stage, the anhydrous aluminum chloride is present in amounts ranging from 10–60 mole %.

Further conditions include a temperature in the order of about 125°–200° C., advantageously about 125°–175° C. and preferably about 125°–150° C.

In the processes illustrated in FIGS. 1 and 2, the aluminous material is aluminum hydroxide which may be obtained in the treatment of bauxite for producing aluminum oxide. Typically, the bauxite is digested in hot caustic solution which dissolves the aluminum oxide with metallic oxide impurities precipitating out. The liquid is cooled and seeded with aluminum hydroxide crystals to precipitate aluminum hydroxide and then evaporated to recover caustic. For the Bayer-Hall-Heroult process, the aluminum hydroxide is dried and calcined to form aluminum oxide which is not required in this process.

As illustrated in FIG. 1, aluminum hydroxide 10 and dodecane 12 as the orgranic liquid containing dialkyl phosphinic acid 14 (where alkyl is 2-ethylhexyl) as the acidic extractant are mixed in an extractor vessel 16 or other suitable mixer during which the aluminum is dehydrated and reacted or complexed with the acidic extractant to form an aluminum composition in the resulting organic phase 18 with the major portion of any water being retained in an aqueous phase 24. The organic phase 18 after separation from the aqueous phase 24 is fed to a water separator 26 for further removal of any entrained and/or solubilized water 27 in the organic phase. Typically, the drying may be carried out by azeotropic distillation. After the drying stage, the organic phase 28 is fed to a second extractor vessel 30 for treatment with a sodium chloride melt 32 from an electrolysis cell 34.

In the second extraction stage, the organic phase 28 and the sodium chloride melt 32 are mixed together in amounts sufficient to remove the aluminum from the organic phase 28 into the sodium chloride melt 32 and form mixed chlorides 36 composed of both alkali metal and aluminum chlorides.

As a source of hydrogen ion, hydrogen chloride gas 38 may be added at this stage to regenerate the acidic extractant 14. The hydrogen chloride gas 38 further provides a source of chloride for forming aluminum chloride and is fed into the extractor vessel 30 at an elevated pressure such as 5–100 atm. Without the use of the chloride melt to form mixed chlorides of alkali metal and aluminum, it is estimated that the pressure of the hydrogen chloride to form aluminum chloride would be excessively high with the value of 16,000 atm. being calculated.

As illustrated, melt 32 not only provides a liquid phase for mixing with the organic phase 28 but also a medium for extracting aluminum. In addition, eutectics with low melting points are formed dependent on particular chloride or chlorides in the melt which also aid in driving the reaction to form aluminum chloride. In general, mixed alkali metal chlorides will form eutectics with lower melting points in comparison to a melt of sodium chloride.

Following formation of a melt 36 of mixed chlorides, the organic liquid 44 with the acidic component but depleted of aluminum is recycled to the first extractor 16. The melt 36 is fed into electrolysis cell 34 and used to maintain the desired concentration of anhydrous aluminum chloride in the bath. As illustrated, a portion of the bath is recycled as a source of alkali metal chloride, to the second extractor 30. In the electrolysis cell 34, chlorine gas 40 is produced as a by product for sale or conversion to gaseous hydrogen chloride and metallic aluminum 42 is removed as product.

In FIG. 2, the process is altered by removing the organic liquid as an organic phase from the second extractor and regenerate the acidic extractant by the addition of water and carbon dioxide to form carbonic acid as a source of hydrogen ion. As illustrated, sodium carbonate is removed and the organic liquid containing the acidic extractant is recycled to the first extractor. As illustrated, aluminum hydroxide 50 and dodecane 52 containing an organic phosphoric acid 54 are mixed in a first extractor 56 to form an organic phase 58 containing a dehydrated aluminum composition. The aqueous phase 64 is removed and the organic phase 58 is dried in water separator 66 with water 67 being removed. Organic phase 68 is then fed to a second extractor 70 and mixed with a sodium chloride melt 72 to extract aluminum in the form of anhydrous aluminum chloride in a mixed chloride melt 77 which is fed to electrolysis cell 74. In cell 74, aluminum 82 and chlorine gas 80 are produced. The organic phase 76 from extractor 70 is fed to reactor 78 where water 84 and carbon dioxide 86 are injected to regenerate the acidic extractant after which the organic liquid 88 is recycled to extractor 56. Sodium carbonate 90 is removed from reactor 78.

As disclosed above, the inventive process provides a number of advantages. It provides a source of anhydrous aluminum chloride as a feedstock suitable for an electrolysis cell for producing metallic aluminum. It is also carried out with primarily two extracting media which are recycled in the process.

The embodiments of the invention in which an exclusive property or privilege is claimed are defined as follows:

1. A process for producing an anhydrous aluminum chloride composition from an aluminous material in an aqueous phase comprising the steps of:

mixing in a first stage the material and an organic liquid substantially immiscible in water and containing an acidic extractant capable of extracting the aluminum from the aqueous phase to form a dehydrated aluminum composition in the organic liquid, the mixing step forming an organic phase containing the organic liquid and the dehydrated aluminum composition;

removing the organic phase from the aqueous phase; and mixing in a subsequent stage the organic phase and at least one alkali metal chloride at an elevated temperature and in amounts sufficient to convert the dehydrated aluminum composition in the organic phase in anhydrous aluminum chloride in a mixture with the alkali metal chloride, the temperature being sufficient to form the mixture of chlorides as a melt.

2. The process of claim 1 which includes the steps of removing the organic phase following extraction of aluminum by the alkali metal chloride, and recycling the organic phase to the first mixing stage.

3. The process of claim 1 which includes the steps of:
feeding the mixture of alkali metal and aluminum chlorides to an electrolysis cell containing a bath composed of at least one alkali metal chloride and aluminum chloride;
operating the cell to form metallic aluminum from the aluminum chloride; and
recycling a portion of the bath to the second mixing stage as a source of the alkali metal chloride for extraction of additional aluminum chloride.

4. The process of claim 2 wherein the first mixing step is carried out at a temperature of about 25°–95° C. with the organic liquid being a saturated aliphatic hydrocarbon containing from about 10–20 carbon atoms or a trialkyl phosphine oxide containing from 12–36 aliphatic saturated carbon atoms.

5. The process of claim 4 wherein the first mixing step is carried out with the aluminous material being aluminum hydroxide and the extractant being a phosphorous-based acid.

6. The process of claim 5 wherein the second mixing step is carried out at a temperature of about 125°–200° C. with the acidic extractant being an organic phosphinic acid and the alkali metal chloride being a sodium, potassium or lithium chloride or mixture thereof.

7. The process of claim 2 which includes the step of feeding the mixture of alkali metal and aluminum chlorides to an electrolysis cell containing a bath composed of at least one alkali metal chloride and aluminum chloride.

8. The process of claim 3 which includes the steps of:
removing the organic phase from the melt of mixed chlorides;
contacting the organic phase with a mineral acid as a source of hydrogen ion, to regenerate the acidic extractant; and
recycling the organic phase containing the acidic extractant to the first mixing stage.

9. A process for producing an anhydrous aluminum chloride composition suitable as a feedstock for an electrolysis cell for producing metallic aluminum, the process comprising the steps of:
mixing in a first stage an aqueous phase containing aluminum hydroxide and an organic liquid substantially immiscible in water and containing an acidic extractant for aluminum at a temperature of about 25°–95° C., the extractant being capable of reacting with the aluminum hydroxide to form a dehydrated aluminum composition, the mixing stage forming an organic phase containing the organic liquid and the aluminum composition;
removing the organic phase from the aqueous phase, and
mixing the organic phase and at least one alkali metal chloride at temperature of about 125°–200° C. in amounts sufficient to convert the dehydrated aluminum composition in the organic phase to anhydrous aluminum chloride in a mixture with the alkali metal chloride, the mixture being in the form of a melt.

10. The process of claim 9 which includes drying the organic phase following the first mixing stage to remove water.

11. The process of claim 10 wherein the organic liquid is a saturated aliphatic with about 12–20 carbon atoms or trialkyl phosphine oxide containing 12–36 carbon atoms and the extractant is a phosphorous based acid or a saturated carboxylic acid.

12. The process of claim 11 wherein organic liquid is dodecane, and the extractant is bis (2-ethylhexyl) phosphinic acid.

13. The process of claim 9 wherein the mixing of the melt of alkali metal chloride and organic phase is carried out in the presence of hydrogen chloride gas.

14. The process of claim 9 wherein the mixing of the organic phase and melt of alkali metal chloride forms an organic phase with a reduced content of the aluminum composition and the process includes the steps of separating the organic phase of reduced aluminum content from the melt and contacting said phase with a mineral acid to generate the acidic extractant.

* * * * *